July 5, 1960 A. M. MOEN 2,943,792
PRESSURE BALANCED VALVE STRUCTURE
Filed Nov. 13, 1956 2 Sheets-Sheet 1
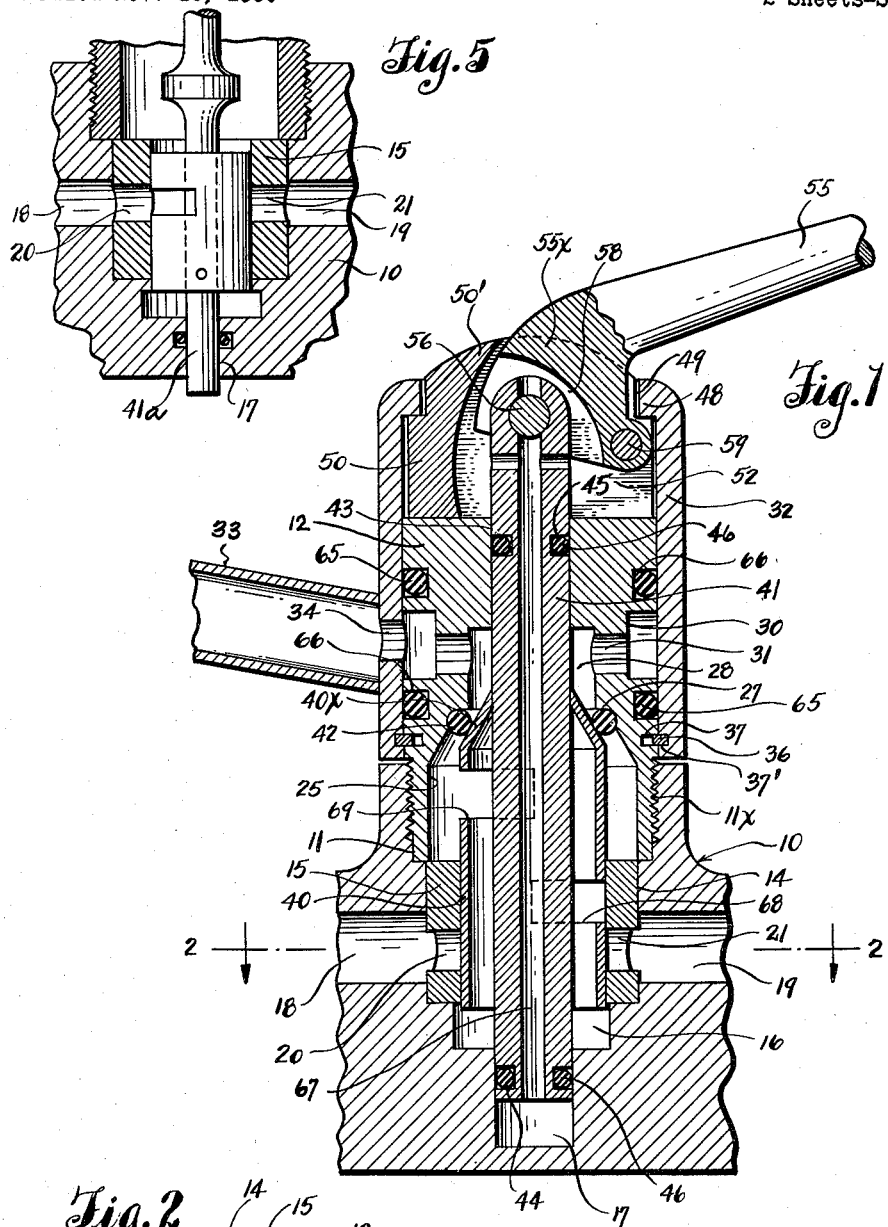
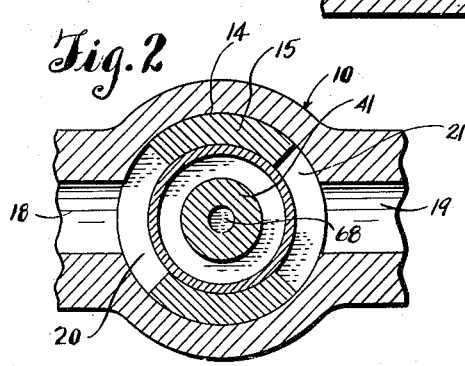
INVENTOR.
ALFRED M. MOEN
BY
Robinson & Berry
ATTORNEYS

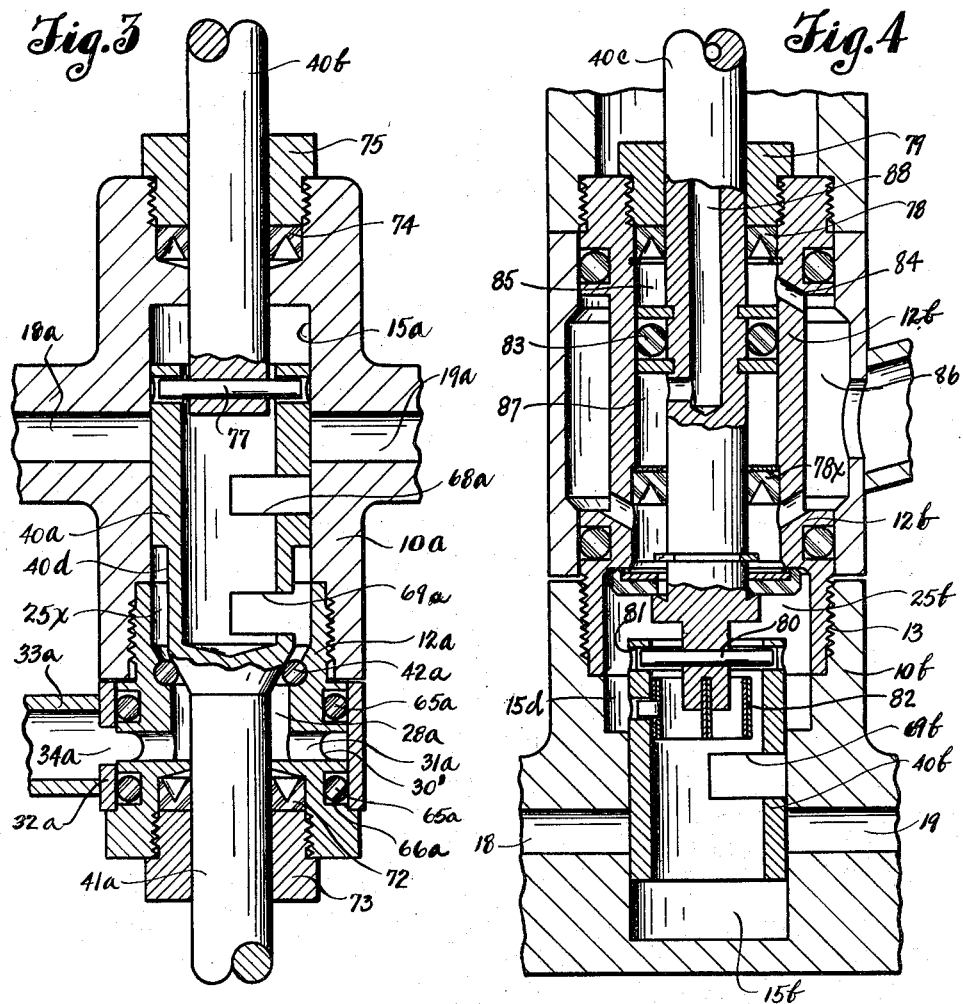

United States Patent Office 2,943,792
Patented July 5, 1960

2,943,792
PRESSURE BALANCED VALVE STRUCTURE
Alfred M. Moen, 377 Woodland Ave., Elyria, Ohio
Filed Nov. 13, 1956, Ser. No. 621,880
5 Claims. (Cl. 236—12)

This invention relates to faucets of those types referred to in trade as "mixing faucets" and which are characterized by the use of a single valve element that is rotatably and longitudinally movable to control both mixture and flow.

It is the principal object of this invention to provide a faucet of the above character wherein the valve, when set in any open position, is pressure balanced to maintain itself in that position; which comprises a self-aligning feature for the movable valve element that will compensate for any possible axial misalignment of the stem mounting and valve cylinder that would cause wear or binding and wherein provision is made for avoiding resistance to easy hand operation that might result from water leakage past the valve stem into the closed end of the valve chamber.

It is a further object of the invention to adapt the present features of improvement to valves with dual controls, such as might be provided for both manual and electrical adjustments. Also, to provide for thermostatic adjustment of the valve to compensate for variations in temperature of the water mixture.

Still further objects and advantages reside in the details of construction and combination of parts embodied in the valve structure, as will hereinafter be fully described.

In accomplishing the above mentioned and other objects of the invention, I have provided the improved details of construction, the preferred forms of which are illustrated in the accompanying drawings, wherein:

Fig. 1 is a vertical section, taken on the axial line of a faucet, embodying the improvements of the present invention therein.

Fig. 2 is a horizontal section of the faucet, taken on line 2—2 in Fig. 1.

Fig. 3 is a vertical section of a faucet as equipped with dual controls, and illustrating a modified form of valve structure.

Fig. 4 is a vertical section of a valve structure with novel features of construction.

Fig. 5 is a sectional view showing an alternative detail of construction in the valve structure of Fig. 1.

Referring more in detail to the drawings;

In Fig. 1, a valve housing 10 is shown to be formed with an upwardly opening bore of stepped diameters, thus providing, at its upper end, a part 11 of greatest diameter into which the lower end portion of a stem mounting plug 12 is threaded, as at 11x, in a water sealed joint. Immediately below the plug receiving portion of the bore, is a continuing portion 14 of reduced diameter into which a cylindrical sleeve 15, of hardened metal is press fitted. Below the sleeve containing portion 14, the bore continues at a further reduced diameter to form a short cylindrical chamber 16, and below this, it continues at a still further reduced diameter, as a cylindrical chamber 17 which is closed at its lower end; all parts of the bore being in axial alignment as shown.

Formed in the housing 10 are hot and cold water inlets 18 and 19 which open through opposite sidewalls of that part of the bore which contains the sleeve 15. These inlets are in direct communication, respectively, with inlet passages 20 and 21 formed in the opposite sidewalls of the sleeve 15. The inside diameter of the sleeve 15 is slightly less than the inside diameter of the next lower portion of the bore which defines the chamber 16. The passages 20 and 21 as formed in the sleeve 15, are oppositely disposed and each extends circumferentially of the sleeve through an arc of about 80° as observed in Fig. 2.

The plug 12 which is threaded into and closes the upper end of the housing bore is formed at its lower end with a coaxial, downwardly opening chamber 25 having a diameter approximately equal to the outside diameter of the sleeve 15. This chamber, designated as the "mixing chamber," extends upwardly into the plug to a substantial distance and has a conical taper at its upper end leading to an annular, downwardly facing shoulder 27, and then merges into a continuing upward bore 28.

Formed in and about the body of the plug 12 is an encircling channel 30 and opening thereinto from the bore 28 are water discharge passages 31. Fitted about the plug 12 for axial rotation thereon, is a sleeve housing 32 which mounts a discharge spout 33, and formed through a sidewall of the sleeve and opening into the spout from channel 30 is a port 34. Thus, water that is admitted from the mixing chamber 25 under pressure into the chamber 28, will be discharged through the passages 31 into channel 30, and from this to the spout 33 regardless of the position of rotation of the spout carrying sleeve 32 on the plug. This sleeve is held in place by a snap ring 36 seated in channels 37—37' formed in the lower end of the plug 12 and sleeve housing.

Reciprocally and rotatably fitted in the valve cylinder as defined by the hardened metal sleeve 15 is an elongated, tubular valve 40, terminating at its upper end in a conically tapered portion 40x through which it is fixed by brazing or welding in a water tight joint, coaxially on an actuating stem 41. The conically tapered end portion 40x of the valve is adapted to close against an O-ring sealing gasket 42 that is seated against shoulder 27 about the entrance to the chamber 28. The length of the tubular valve 40 is such that when seated, its lower end terminates approximately at the lower end level of the valve cylinder 15. This valve 40 is adapted to be rotatably and longitudinally adjusted through the mediacy of the stem 41 as presently explained, and the valve stem extends rotatably and slidably through a bore 43 formed axially in the upper end of the plug 12 and opening into the chamber 28. The lower end of the stem is rotatably and reciprocally fitted at its lower end in the bored chamber 17, and in its lower and upper end portions, respectively, it is formed with encircling channels 44—45 in which O-ring sealing gaskets 46 are fitted in sealing contact with the enclosing walls.

The upper end portion of the housing sleeve 32, which is tubular in form, extends somewhat above the upper end of the plug 12, and at that end is formed with an inturned peripheral flange 48 defining a central opening 49. Fitted for rotation within the upper end portion of the housing 32 is a circular bearing block 50 which has a flat bottom surface disposed upon the flat upper end surface of the plug 12 and retained against looseness and for rotation thereon by the flange 48. The bearing block 50 is formed with a central, upwardly extending portion 50' projecting through the opening 49. The bearing block also is formed with a diametrically directed recess 52 that opens vertically therethrough and to one side thereof. The upper end portion of the valve stem 41 extends into this recess and is therein pivotally connected to the inner end of a valve adjusting handle, designated in its entirety by reference numeral 55, by a pivot pin 56.

It is to be observed in Fig. 1 that the inner end portion of the handle 55 terminates in an enlarged head portion 55x which is contained with freedom of movement in the bearing recess 52. This head portion is formed in the longitudinal direction of the handle, and opening to its underside, with a channel 58 in which the upper end portion of the stem 41 is received. A pivot pin 59, directed horizontally through the parts 50 and 55x pivotally attaches the handle head 55x to the bearing block 50. The pin 59 is parallel to the pin 56 and eccentrically of the valve stem. Thus, by an up and down action of the outer end of the handle 55, the stem will be lowered and raised accordingly to open and close the valve, and by swinging the handle horizontally about the axial line of the stem, the valve will be rotated accordingly to vary the water mixture.

Any possible leakage from the plug along the sleeve housing is prevented by the use of O-ring gaskets 65 applied within encircling channels 66 formed in the plug body above and below the encircling channel 30.

In order to avoid any resistance to easy operation that would arise in the event that water should leak along the valve sleeve housing and be trapped in chamber 17, the stem is formed with a longitudinal bore 67 that opens to both ends thereof.

It is also to be observed in Fig. 1 that the tubular valve member 40 is formed in its lower end portion with a circumferentially directed inlet passage 68 that extends through an arc of approximately 180°. Also, the valve is formed in its upper end portion with an outlet 69 that opens into the mixing chamber 25. There is substantial water flow clearance between stem and the enclosing walls of the tubular valve.

With the faucet so constructed, the valve 40 can be opened for admittance of water by lifting the outer end of the handle 55, thus to bring passage 68 into registration to more or less extent with one or both of the inlet passages 20 or 21. Then by swinging the handle horizontally to the right or left, the proportionate amounts of water admitted through the hot and cold water connections can be varied as desired, or an all cold or all hot outflow can be established.

It is further to be explained that in the present structure, the tubular valve 40 is of a rather flexible material and when connected to the valve stem in the manner shown, it will be yieldingly movably relative to the stem, and thus it is self aligning to the extent necessary to compensate for any slight misalignment of stem and sleeve 15, that might result from warpage, or inaccuracies in machining the assembled parts.

The balanced structure of Fig. 3 is designed for dual operation, that is, for example, it is applicable to sinks or the like where connections are made therewith for both foot and hand adjustment of the valve. In this illustration, 10a designates the valve housing and it is shown to be formed with a bore directed upwardly thereinto from its lower end, providing a cylindrical valve chamber 15a in which a tubular valve 40a is reciprocally and rotatably fitted for adjustment, the valve member being integrally formed on the upper end of a valve stem 41a. This stem extends downwardly through a plug 12a that is threaded upwardly into lower end of the valve chamber 15a. The stem passes through a packing ring 72 that is secured in the plug by a packing nut 73 through which the stem also passes.

The valve housing 10a is formed with hot and cold water inlets 18a and 19a that open into the chamber 15a at diametrically opposite sides. The tubular valve 40a has a circumferentially directed inlet passage 68a intermediate its ends, opening into its hollow or tubular body, and near its mergence into or with the stem, has a lateral outlet 69a.

The plug 12a is formed at its upper end with a mixing chamber 25x, opening at its upper end into the valve cylinder 15a. This chamber merges at its lower end into a coaxial chamber 28a of lesser diameter, from which radial outlets 31a lead into an annular channel 30' formed in and about the plug body. A sleeve housing 32a is fitted about the plug, overlying the channel 30' and this mounts a spout 33a that communicates, through a port 34a in the sleeve, with the channel 30'. O-ring sealing gaskets 65a are applied in channels 66a which encircle the plug body above and below the channel 30' to prevent leakage.

It is also to be observed that the lower portion of the valve body is reduced in diameter as at 40d, to provide a passage for the outflow of the water from the valve to the mixing chamber 28a. It is also shown that the conically tapered lower end portion of the valve body is adapted to seat, when closed, against an O-ring sealing gasket 42a fitted in the plug at the entrance into chamber 28a. Means provided for actuation of the valve 40a from above is shown to comprise a stem 40b that enters the valve chamber 15a coaxially thereof, in its upper end, passing through a packing ring 74 held by a packing nut 75. The stem is slidably and rotatably mounted, and at its lower end has a pivot pin connection 77 with the upper end of the valve.

It will be understood that since the stems 41a and 40b are of equal diameter, opposite water pressures against the open valve 40a, are balanced. By so pressure balancing the valve and stem assembly, the valve will remain in any open position at which it is set.

In the use of a valve so designed, suitable handle means of various kinds could be used in connection with both stems for valve adjustment.

The valve structure of Fig. 4 comprises a valve housing 10b with hot and cold water inlets 18 and 19 arranged as in the faucet of Fig. 1. Likewise, the housing 10b is formed with a bore of stepped diameters providing, at its lower end, a cylindrical valve chamber 15b into the opposite sides of which the water inlets 18 and 19 open. A valve stem mounting plug 12b is threaded at its lower end, as at 13, into the upper end of the housing bore, and this plug also is formed at its lower end with a mixing chamber 25b; this having a diameter equal to that of the intermediate portion 15d of the stepped bore and each serving as a continuation of the other.

Reciprocally and rotatably fitted in the valve cylinder 15b is a tubular valve 40b, with a sidewall opening 69b adapted, by vertical adjustment of the valve, to be moved into and from registration with the inlets 18 and 19 for inflow and by rotation, to determine the water mixture, as in the faucet of Fig. 1.

Adjustments of the valve 40b are effected by a stem 40c that extends downwardly into the plug, coaxially thereof, through a packing ring 78 applied within its upper end portion and held by a packing nut 79 that is threaded into the upper end of the plug bore and a lower packing 78x.

At its lower end the stem 40c is connected to valve 40b by a pin 80 extended therethrough with its opposite ends, contained in an internal annular channel 81 formed in the upper end portion of the valve. Rotary adjustment of the valve 40b relative to the stem is effected automatically through the functioning of a thermostatic coil 82 which is connected at its opposite ends, respectively, to the valve 40b and stem 40c to compensate for changes in temperature of water flowing therethrough.

In the device of Fig. 4, I have also shown an alternative way of pressure balancing the valve structure. For this purpose an O-ring seal 83 is provided about the stem 40c within the cylindrical body portion of plug 12b between the packing elements 78 and 78x, and a port 84 opens into the closed space 85 above this seal from the discharge chamber 86 which surrounds the plug 12b. The space 87 below the seal 83 is vented to atmosphere through a passage 88 in the stem 40c. Discharge pressures acting downwardly on seal 83, then will balance the pressures acting upwardly against the stem; this being due to the fact that the pressure area about the stem in the chamber is made equal to the area of the stem against which the upward pressure acts.

In Fig. 5 I have illustrated an alternative construction. In this, the bore chamber 17 continues downwardly through the housing 10 opening to the lower side thereof. The valve stem 41a extends into this chamber for rotary and reciprocal movement. The valve structure might be like that of Fig. 1 or similar thereto, therefore the parts shown on Fig. 5 have been given reference numerals like those of corresponding parts seen in Fig. 1.

What I claim as new is:

1. A mixing valve structure comprising a valve housing having an outlet chamber therein, a mixing valve member mounted in the chamber, the mixing valve member being reciprocably and rotatably movable to control the volume, selection and mixture of the fluids passing through the housing, the mixing valve member including a stem portion extending therefrom so that at least a part of the same is exposed to the atmosphere, a discharge passage leading from the outlet chamber, the housing having inlets terminating in ports controlled by the mixing valve member; and pressure balancing means in the valve housing which maintain the stem portion in balanced condition and comprising a fluid pressure chamber and an atmospheric pressure chamber in communication with the atmosphere, means connecting said fluid pressure chamber to the outlet chamber, separating means carried by and movable with the stem portion and forming a common wall between the two pressure chambers, and sealing means about the stem portion and sealing the opposite ends of the two pressure chambers opposed to said common wall.

2. In a valve structure, as in claim 1 wherein a thermostatic element is connected to the stem and valve element for effecting a relative turning adjustment of the valve about the stem to automatically compensate for temperature change of running water after an adjustment has been made by the stem.

3. A mixing valve structure as set forth in claim 1 wherein an area of the fluid pressure chamber is substantially equal to the diameter of the stem.

4. A mixing valve structure as set forth in claim 1 wherein the separating means is secured to the stem portion above the discharge passage.

5. A mixing valve structure as set forth in claim 4 wherein the separating means comprises a sealing ring surrounding the stem portion, the stem portion having spaced circumferential notches therein and annular plates fitted in the notches on each side of the sealing ring to hold the sealing ring in position.

References Cited in the file of this patent

UNITED STATES PATENTS

| | | |
|---|---|---|
| 1,320,944 | Thoens | Nov. 4, 1919 |
| 2,516,996 | Jensen | Aug. 1, 1950 |
| 2,609,206 | Moen | Sept. 2, 1952 |
| 2,670,901 | Biermann | Mar. 2, 1954 |
| 2,692,114 | Fullwood | Oct. 19, 1954 |

FOREIGN PATENTS

| | | |
|---|---|---|
| 746,663 | Great Britain | Mar. 21, 1956 |